United States Patent [19]

Tonge et al.

[11] Patent Number: 4,730,217

[45] Date of Patent: Mar. 8, 1988

[54] MOVEMENT DETECTOR FOR USE IN TELEVISION SIGNAL PROCESSING

[75] Inventors: Gary J. Tonge; Barry A. Flannigan, both of Winchester, United Kingdom

[73] Assignee: Independent Broadcasting Authority, England

[21] Appl. No.: 743,993

[22] PCT Filed: Oct. 24, 1984

[86] PCT No.: PCT/GB84/00360

§ 371 Date: Jun. 12, 1985

§ 102(e) Date: Jun. 12, 1985

[87] PCT Pub. No.: WO85/02080

PCT Pub. Date: May 9, 1985

[30] Foreign Application Priority Data

Oct. 24, 1983 [GB] United Kingdom ............... 8328362

[51] Int. Cl.[4] .................. H04N 5/14; H04N 5/21; H04N 7/01
[52] U.S. Cl. .................. 358/160; 358/105; 358/140; 358/167
[58] Field of Search ............ 358/163, 166, 167, 188, 358/140, 105, 36, 160

[56] References Cited

U.S. PATENT DOCUMENTS

| | | | |
|---|---|---|---|
| 4,232,338 | 11/1980 | Netravali | 358/105 |
| 4,296,436 | 10/1981 | Achiha | 358/105 |
| 4,322,750 | 3/1982 | Lord | 358/140 |
| 4,393,396 | 7/1983 | Raven | 358/36 |

FOREIGN PATENT DOCUMENTS 18856 11/1980 European Pat. Off. .

OTHER PUBLICATIONS

Digital Standards Converter by Adaptive Intra-Frame Line Interpolation, by K. Kinuhata, et al., IEEE Transactions on Communications, vol. COM-26, No. 10, Oct. 1978, pp. 1413-1419.

Primary Examiner—Tommy P. Chin
Attorney, Agent, or Firm—Watson, Cole

[57] ABSTRACT

A movement detector for detecting movement in a television picture comprises a local movement detector which produces an output signal as a result of comparing similar input signals from different fields and the detector output signal is processed in a field store processor which spreads the output signal in space and in time. The processor comprises a recursive loop, a field delay element and a look-up table, with the latter receiving as inputs the output from the recursive loop and the instantaneous input to the processor to produce a control signal output. A line interlace to non-interlace transformation circuit including such a movement detector is also disclosed.

6 Claims, 7 Drawing Figures

MOVEMENT DETECTOR FOR USE IN TELEVISION SIGNAL PROCESSING

BACKGROUND OF THE INVENTION

1. Field of the Invention

The present invntion relates to a movement detector for use in television signal processing.

2. Related Art

There are a number of applications in television signal processing which benefit from motion-adaptive processing. For example it is desirable to operate noise reduction methods in stationary parts of a scene but not in moving parts. In the field of digital television data rate reduction there are often different algorithms suitable for moving and for stationary picture areas. Also in line-rate conversion, different interpolation schemes are sometimes needed depending on scene motion. In each of these cases a number of difficulties arise in defining suitable movement detection processing. For example noise (or subcarrier in an environment where composite colour coding is used) can masquerade as scene movement. There is one area of difficulty however which arises specifically in the application of line-rate conversion. This will now be described for the specific application of up-conversion from a line-format with 2:1 interlace to a non-interlaced format, although conversion to other line formats will show one some difficulty.

In order to achieve improvement in picture quality it is possible to "upconvert" an interlaced signal for display with a higher line-rate.

This may take place, for example, in a satellite broadcasting receiver designed for displaying extended definition signals. The relationship between an incoming interlaced line-format and a resulting non-interlaced line format, for example, is illustrated in FIG. 1. Crosses indicate received interlace lines and circles indicate the additional lines which need to be interpolated to provide a non-interlaced scan. The dot is taken as an example line (in "field 0") to be interpolated and the "surrounding" (in space and time) received interlace lines are labelled A,B,C and D. If the appropriate area of the scene is stationary, then the best method of interpolation for the new line is to base it on values taken from the same vertical position. For example an average of A and B would be suitable (a form of "temporal interpolation"). This would enable the full vertical resolution capabilities of the received interlaced lines to be achieved. If there is some scene movement in the vicinity of lines A,B,C and D however then values from positions A and B would provide an erroneous interpolation and a better option would be to use lines from the same field. For example an average of C and D (a form of "vertical interpolation") could be suitable. If however C and D were used for interpolation in a stationary scene, then vertical resolution would be sacrificed and much of the picture quality improvement promised by this technique would be lost. A movement detection circuit is therefore required in order to provide a control signal for determining the appropriate interpolation procedure.

One approach would be to use an absolute frame difference signal i.e. k=1A-B1 where k provides the basis for this control signal. In general, movement will give rise to a significant frame difference value while stationary picture detail will yield a zero frame-difference value. Thus a large frame difference signal is required and a very small frame difference signal could be used to indicate that temporal interpolation is required. Usually there will be more than two options for interpolation so that the transition in a scene from one type to the next would not be so abrupt. Typically there could be a number of options ranging from purely vertical interpolation at one extreme to purely temporal interpolation at the other. Intermediate interpolators would use lines displaced both vertically and temporally.

There is a fundamental difficulty which arises with such movement detection. This is because certain types of movement "bypass" the detector and result in a zero frame-difference signal. This difficulty does not arise in the systems based on a single scanning standard, such as noise reducers, and is thus specific to the application of line-rate conversion. For example consider a horizontally moving bar as illustrated in FIG. 2. As in FIG. 1, field 0 represents the current field in which a line is to be interpolated while field-1 is the previous field and field 1 is the subsequent field. The frame difference signal which results from such a bar is illustrated for field 0 in FIG. 3a. FIG. 3b shows the corresponding position of the bar itself. It can be seen that during the bar itself the framedifference value is zero even though the bar is moving. This would give rise to an inappropriate type of interpolation being used for lines within the bar. This effect can occur in practice and it can give objectionable results, especially with critical picture material such as electronically operated moving captions. This type of difficulty is not peculiar to a frame-difference approach to movement detection. Any movement-detection algorithm which acts on a local basis and which takes lines from only fields −1, 0 and 1 would encounter a similar difficulty. Indeed the desired movement information is simply not available in the received interlaced signal. Theory shows that a high vertical frequency which is stationary and this type of movement are indistinguishable on a local basis. It can be seen however that there is a frame-difference signal in FIG. 3a to the left and to the right of the bar position. Therefore if some "spreading" of the frame-difference signal is applied it is possible to alleviate this difficulty. This is the approach which has been adopted so far by research workers in this field. Typically a low-pass filter is used to "spread" the frame-difference signal. There is however a difficult compromise to reach concerning the degree of spreading to be applied. Too much would unduly restrict the resolution of the movement detector. Too little, on the other hand, would too severely limit the speed of movement range over which the technique would be effective. This is because the spacing between the frame difference pulses illustrated in FIG. 3B is directly proportional to the speed of movement of the bar. In addition a horizontal spreading technique is not effective for the similar difficulties which can occur with vertical motion.

SUMMARY OF THE INVENTION

An object of the present invention is to overcome the inadequacies of the approach which has previously been used.

The present invention relies on the principle of spreading the local movement-detection signal (e.g. the frame-difference) not only in space but in time. This has the effect of producing a spatial "spread" which is automatically appropriate to the speed and direction of motion. It is vital that this time-spread is in terms of individual fields, rather than frames, in order to overcome the difficulty outlined in FIG. 3. The electronic storage required to achieve this effect can be significantly reduced by allocating a small number of bits to the signal to be stored and by storing it on a block basis rather than necessarily on an element by element basis.

BRIEF DESCRIPTION OF THE DRAWINGS

Features and advantages of the present invention will become apparent from the following description of an embodiment thereof given by way of example with reference to the accompanying drawings, in which.

DETAILED DESCRIPTION OF THE PREFERRED EMBODIMENT

Figure 4:
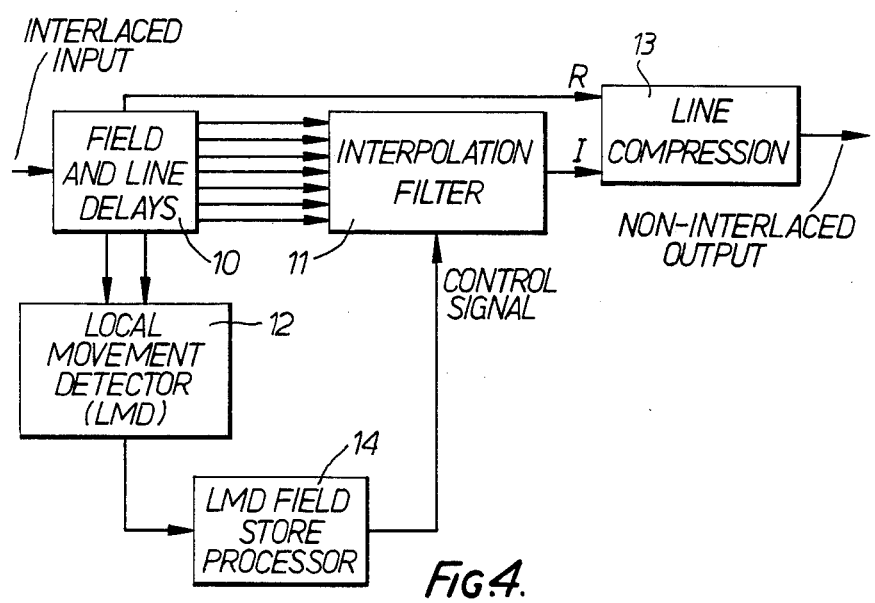
FIG. 4 is a block diagram of interlaced to non-interlaced scan conversion equipment according to the present invention.
Figure 5:
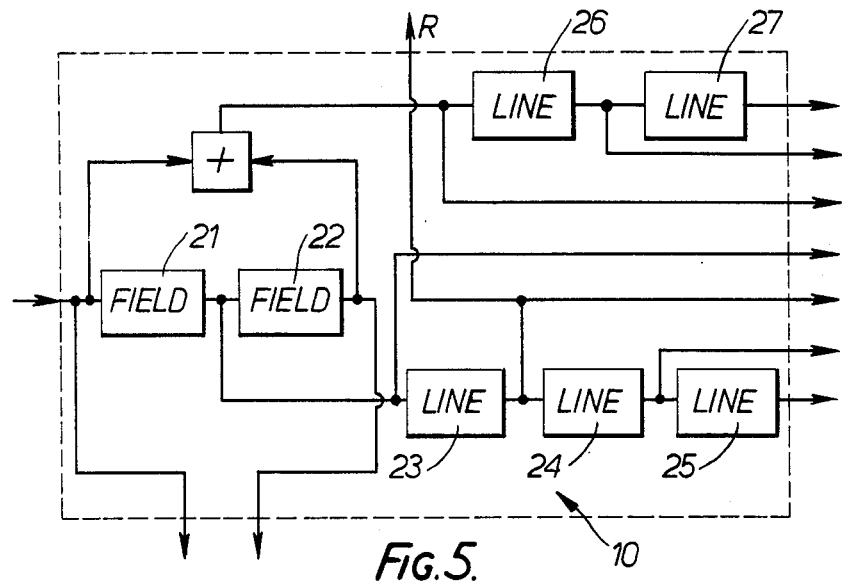
FIG. 5 is a further block diagram showing in more detail the circuitry of one of the blocks shown in FIG. 4.
Figure 6:
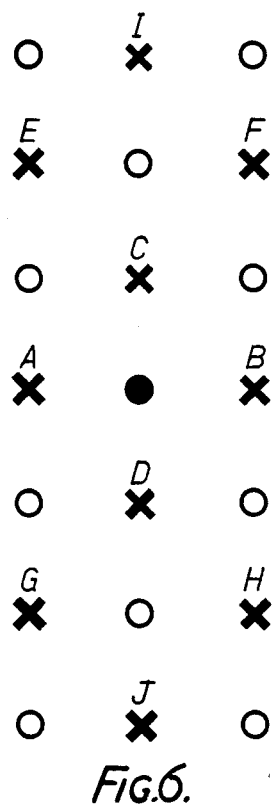
FIG. 6 is a grid showing the lines available for interpolation from the circuitry shown in FIG. 5.

A block diagram of a preferred form of scan conversion equipment is shown in FIG. 4. The incoming interlaced lines first enter a delay network 10 consisting of line and field delays. Several outputs are provided with different elements of delay for an interpolation filter 11. In addition a suitably delayed version of the input signal is provided for use as a "real line" (R) for alternate lines when interpolation is not required. The field and line delay network 10 also provides the necessary delayed elements for a local movement detector circuit 12. An example of a field and line delay network 10 using two field delays 21,22 and five line delays 23,24,25,26 and 27 is shown in FIG. 5. In this example the outputs to the local movement detector circuit 12 are appropriate to a frame difference approach and the outputs to the interpolation filter 11 make available the lines A,B,C,-D,E,F,G,H,I and J, which are illustrated in FIG. 6, for interpolation purposes. The lines A,B,E,F,G and H are made available only as the sums (A+B), (E+F) and (G+H) since a symmetrical filter is assumed and since this saves line storage. The output providing real lines is shown at the top of the diagram and indicated by the reference R. Its precise delay will depend on the delay introduced in the movement-detection control loop.

Figure 1:
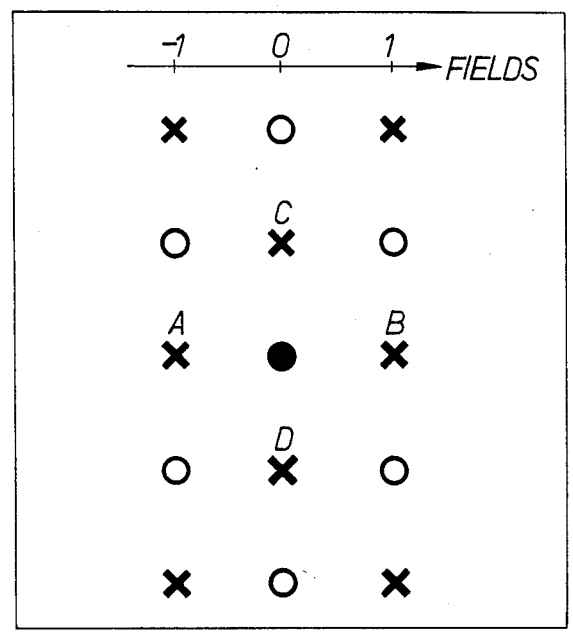
FIG. 1 shows a vertical-temporal grid of five lines and three fields for sequential scan up-conversion.
Figure 2:
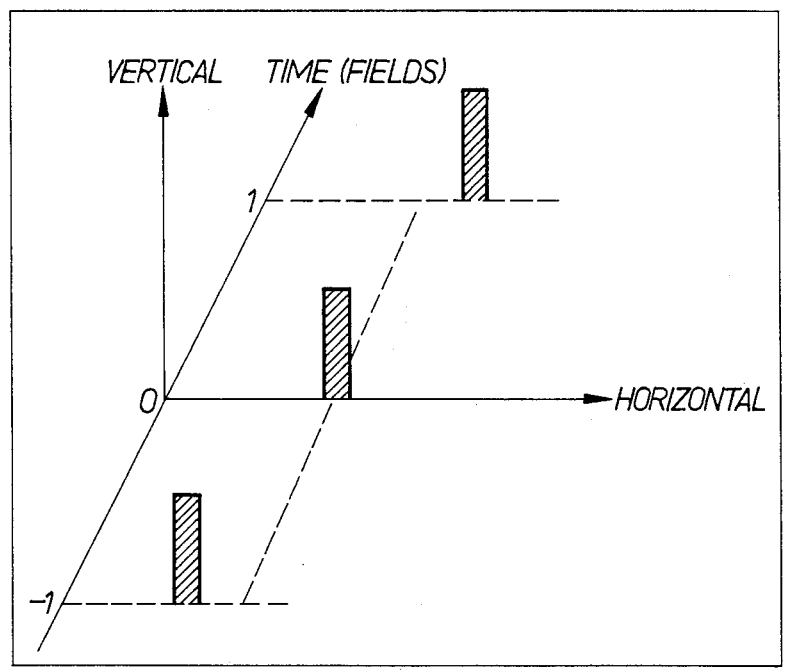
FIG. 2 shows a diagrammatic representation of a horizontally moving bar over three television fields.
Figure 3:
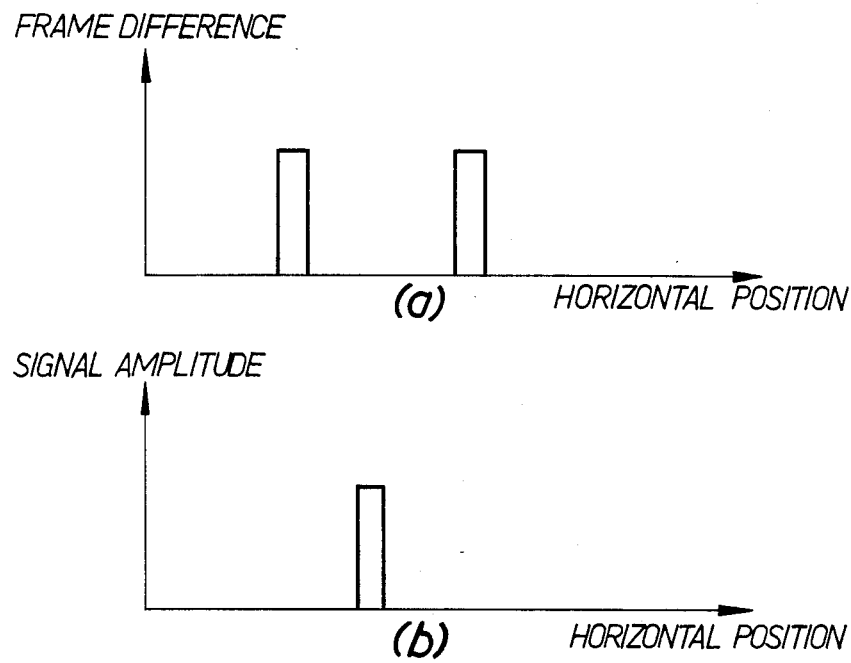
FIG. 3a and 3b show the frame difference signal (a) compared with the picture signal itself (b) for the moving bar of FIG. 2 in field 0.
Figure 7:
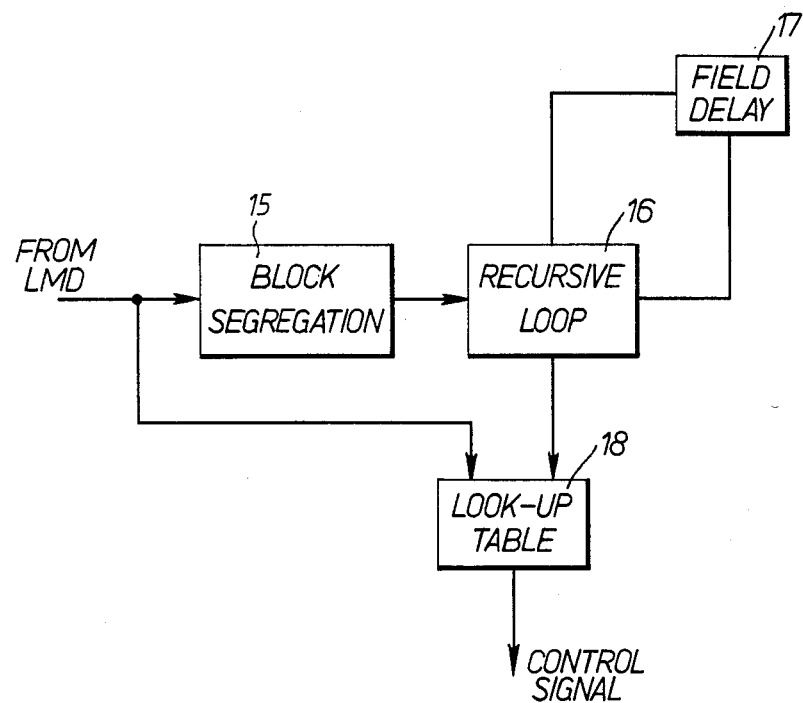
FIG. 7 shows yet a further block diagram shown in more detail the circuitry of another of the blocks shown in FIG. 4.

The interpolation filter 11 applies weighting to its different delayed inputs as dictated by a control signal. This leads to interpolated lines (I) which are fed to a line compression circuit 13 along with real lines (R). This circuit then combines the real and interpolated lines to provide the non-interlaced output. Of particular importance here is the movement detection control loop which provides the control signal for the filter 11. This consists initially of the local movement detector (LMD) 12. This will typically be based on an absolute frame difference signal. It may also include noise reduction circuitry. The additional and new item in this implementation is a LMD field-store processor 14. It is this circuit which performs the "spread in time", which was described above for overcoming the special difficulties associated with movement detection in scan conversion. A generalised block diagram of the LMD field store processor 14 is shown in FIG. 7. The signal from the LMD (12) is segregated into blocks each consisting of a plurality of horizontal samples and lines by a block segregation circuit 15. The sample values within a block would be accumulated and the accumulated sum coded with a low number of bits (3 or 4 for example), since fine amplitude resolution of the LMD signal is not required. The blocks (say 8 horizontal samples by 3 lines, for example) would then be temporarily processed by the recursive loop circuit in FIG. 7. This circuit would modify the present value by the appropriate value from previous fields, by the use of a recursive loop 16 with a field delay element 17. The output of the recursive loop 16 would be fed into a look-up table 18 along with the unmodified LMD signal, to provide the interpolation control signal for application to the filter 11. The control signal is changed on an element-by-element basis by taking into account both the LMD signal for that element and the recursive loop output for the appropriate block. By using the recursive loop to incorporate the effects of previous fields into the control signal, the difficulties of movement detection exemplified by Figs. 2 and 3 are overcome. Thus the use of this technique provides a more reliable interpolation for scan-conversion than has previously been possible.

The technique is also efficient in its use of field storage.

We claim:

1. Television signal processing apparatus comprising delay circuitry for receiving a series of input signals and including means for producing a series of output signals representing input signals delayed by a plurality of lines and a plurality of fields, movement detection means responsive to said series of output signals for producing from signals which are a frame apart a series of movement detection signals, first processing circuitry responsive to the detection signals from the movement detection means for modifying a present detection signal by a further signal which is a function of a previous detection signal for producing a control signal, and further processing means responsive to the control signal and connected to the delay circuitry to receive outputs therefrom for producing a processed television signal in the presence of movement as determined by said control signal.

2. Apparatus according to claim 1, wherein the first processing circuitry comprises a recursive loop and a field delay element.

3. Apparatus according to claim 2, wherein the first processing circuitry comprises a look-up table, the control signal output from the look-up table being a function of the instantaneous current detection signal output from the movement detection means and input to the first processing circuitry and the output of the recursive loop.

4. Apparatus according to claim 3, wherein the first processing means comprises means arranged to produce a respective value for each of the series movement detection signals, means for accumulating said values to provide an accumulated signal, and means for encoding the accumulated signal to produce a signal for input to the recursive loop.

5. Apparatus according to claim 1, wherein the further processing means includes an interpolating filter.

6. Apparatus according to claim 5, wherein the further processing means includes a line compression circuit connected to receive interpolated outputs from the interpolating filter and output signals directly from the delay circuitry to produce said processed television signal.

* * * * *